US008812635B2

(12) United States Patent
Datla et al.

(10) Patent No.: US 8,812,635 B2
(45) Date of Patent: Aug. 19, 2014

(54) APPARATUS AND METHOD PROVIDING UNIFIED NETWORK MANAGEMENT

(75) Inventors: Krishnam Datla, Union City, CA (US); Srinivasa Beereddy, Fremont, CA (US); Praveen Vengalam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 2946 days.

(21) Appl. No.: 11/012,884

(22) Filed: Dec. 14, 2004

(65) Prior Publication Data

US 2005/0152288 A1    Jul. 14, 2005

Related U.S. Application Data

(60) Provisional application No. 60/481,788, filed on Dec. 14, 2003.

(51) Int. Cl.
*G06F 15/173* (2006.01)
*H04L 12/28* (2006.01)
*H04L 12/24* (2006.01)

(52) U.S. Cl.
CPC ............ *H04L 41/0613* (2013.01); *H04L 41/12* (2013.01); *H04L 41/0803* (2013.01); *H04L 41/0886* (2013.01)
USPC .......................................... 709/223; 370/256

(58) Field of Classification Search
CPC .. H04L 41/12; H04L 41/0803; H04L 41/0886
USPC ........................................................ 709/223
See application file for complete search history.

(56) References Cited

U.S. PATENT DOCUMENTS

| | | | |
|---|---|---|---|
| 4,720,782 A | | 1/1988 | Kovalcin |
| 5,696,697 A | * | 12/1997 | Blau et al. ................. 707/103 R |
| 5,751,967 A | | 5/1998 | Raab et al. |
| 5,835,696 A | | 11/1998 | Hess |
| 5,963,540 A | | 10/1999 | Bhaskaran |
| 6,148,410 A | | 11/2000 | Baskey et al. |
| 6,229,787 B1 | | 5/2001 | Byrne |
| 6,456,600 B1 | | 9/2002 | Rochberger et al. |
| 6,584,499 B1 | * | 6/2003 | Jantz et al. ..................... 709/220 |
| 6,628,661 B1 | | 9/2003 | Goldman et al. |
| 6,636,239 B1 | * | 10/2003 | Arquie et al. ................. 715/736 |
| 6,725,264 B1 | | 4/2004 | Christy |
| 6,748,429 B1 | | 6/2004 | Talluri et al. |
| 6,788,315 B1 | | 9/2004 | Kekic et al. |
| 6,856,591 B1 | | 2/2005 | Ma et al. |
| 6,903,755 B1 | | 6/2005 | Pugaczewski et al. |
| 7,076,645 B2 | | 7/2006 | Mittal et al. |
| 7,092,354 B2 | | 8/2006 | Jensen |

(Continued)

OTHER PUBLICATIONS

Hewlett-Packard, "Using Network Node Manager—HP OpenView, Edition 1," Copyright 1997, J1136-90001 HP-UX and Solaris, Apr. 1997, pp. 1-80.

(Continued)

*Primary Examiner* — David Lazaro
*Assistant Examiner* — Xiang Yu
(74) *Attorney, Agent, or Firm* — Hickman Palermo Truong Becker Bingham Wong LLP

(57) ABSTRACT

A unified network management framework enables a network operator to manage an entire network as if the operator is managing a single device.

22 Claims, 7 Drawing Sheets

(56) References Cited

U.S. PATENT DOCUMENTS

| | | | |
|---|---|---|---|
| 7,139,928 | B1 | 11/2006 | Bhattacharya et al. |
| 2001/0021198 | A1 | 9/2001 | Hsu et al. |
| 2001/0030785 | A1 | 10/2001 | Pangrac et al. |
| 2002/0009048 | A1 | 1/2002 | Hosler et al. |
| 2002/0049859 | A1 | 4/2002 | Brucket et al. |
| 2002/0083431 | A1* | 6/2002 | Machida ............ 717/174 |
| 2002/0186653 | A1 | 12/2002 | Jensen |
| 2003/0169692 | A1 | 9/2003 | Stern et al. |
| 2003/0176003 | A1 | 9/2003 | Schaff et al. |
| 2003/0196003 | A1 | 10/2003 | Shah |
| 2004/0088412 | A1 | 5/2004 | John et al. |
| 2004/0268112 | A1 | 12/2004 | Mittal et al. |
| 2008/0019499 | A1* | 1/2008 | Benfield et al. ........ 379/221.15 |

OTHER PUBLICATIONS

Hewlett-Packard Company, "A conversion with NonStop TMF architect Charles Johnson article," 2002, pp. 1-4. (text provided on CD-ROM).

Compaq Computer Corporation, "Driving Enterprise E-Business, Compaq NonStop Himalaya Servers White Paper," 2000, pp. 1-18. (text provided on CD-ROM).

Gartner, Inc., "Hewlett-Packard NonStop Enterprise Server," 2003, http://www.gartner.com/gc.webletter/hp/article1/article1.html, data retrieved Mar. 11, 2004, pp. 1-9. (text provided on CD-ROM).

International Business Machines Corporation, "Concepts and Facilities Guide, Version 5.1," First Edition (Jun. 2003, updated Jul. 2003), pp. 1-168. (text provided on CD-ROM).

Krakower, Elaine A. et al., "High Availability Network Server using HACMP/ES," e-developerEDGE, Issue, 2001, 9 pages. (text provided on CD-ROM).

Hewlett-Packard Company, "HP NonStop System Console (NSC) and console software suite," 2003, pp. 1-7. (text provided on CD-ROM).

Author Unknown, "Configuring Failover," Chapter 10, pp. 10-1-10-38. (text provided on CD-ROM).

Cisco Systems, Inc., "Network Registar User's Guide," Software Release 5.0, 2000, pp. 1-376. (text provided on CD-ROM).

Hewlett-Packard Company, "HP NonStop Technical Library," Data Sheet, 2004, pp. 1-7. (text provided on CD-ROM).

Cisco Systems, Inc., "Network Registar User's Guide," Software Release 5.5, 2000, pp. 1-350. (text provided on CD-ROM).

IBM Corporation, "High Availability Cluster Multi-Processing of AIX", Concepts and Facilities Guide, Version 5.1, Jul. 2003.

* cited by examiner

```
[network]# dir
Directory of /network/
dr-- <n/a>         <n/a>         devices/
dr-- <n/a>         <n/a>         groups/
[network]# cd devices
[network]# dir
Directory of /network/devices/
        name          type          status        device
dr-- jahi-rtr-1      Router        P3-alarm      192.168.1.1/
dr-- jahi-switch-1   Switch        P3-alarm      92.168.1.5/
dr-- ap              AccessPoint   normal        192.168.1.16/
dr-- Jahi-AP-1       AccessPoint   normal        192.168.1.201/
dr-- ap              AccessPoint   normal        192.168.1.18/
dr-- Jahi-AP-5       AccessPoint   P3-alarm      192.168.1.205/
dr-- ap              AccessPoint   normal        192.168.1.22/
[network]# cd ..
[network]# cd groups
[network]# dir
Directory of /network/groups/
        type      No.of Devices    group
dr-- dynamic         1             Unknown/
dr-- dynamic         6             AccessPoints/
dr-- dynamic         1             Switches/
dr-- dynamic         9             MyGroup/
dr-- dynamic         1             offline-devices/
dr-- static          0             s1/
[network]# cd AccessPoints
[AccessPoints]# dir
Directory of /network/groups/AccessPoints/
        name          type          status        device
dr-- ap              AccessPoint   normal        192.168.1.16/
dr-- Jahi-AP-1       AccessPoint   P3-alarm      192.168.1.201/
dr-- ap              AccessPoint   normal        192.168.1.18/
dr-- Jahi-AP-5       AccessPoint   P3-alarm      192.168.1.205/
dr-- ap              AccessPoint   normal        192.168.1.22/
```

*Fig. 4*

```
[network]# network group AccessPoints
[AccessPoints]# configure
Entering network configuration mode. Number of devices selected: 6
Selected device types:

Device Type        No. of devices
    ----------         --------------
    AP100              1
    AP200              1
    AP300              3
All selected devices are not of the same type. Command input will be restricted to
a common set of commands that apply to all the selected device types.

[AccessPoints](configure)# interface all-fast-ether
[AccessPoints](configure)# interface all-fast-ethernet
Following commands apply to 6 interfaces
[AccessPoints](network-config-if)#
```

*Fig. 5*

```
[network]# cd AccessPoints
[AccessPoints]# dir
Directory of /network/groups/AccessPoints/
    name           type              status        device
  dr-- ap          AccessPoint       normal        192.168.1.16/
  dr-- Jahi-AP-1   AccessPoint       P3-alarm      192.168.1.201/
  dr-- ap          AccessPoint       normal        192.168.1.18/
  dr-- Jahi-AP-5   AccessPoint    P3-alarm      192.168.1.205/
  dr-- ap          AccessPoint       normal        192.168.1.22/

[AccessPoints]# show alarms
 Showing network alarms
 A/C   A - Active, C - Clear
 Sev   Alarm Severity
 Count Number of times this state is triggered Id Sev Device IP          Component    Condition 27 P3  192.168.1.201       Do0         FCSErrors relative to RF throughput:
   26 P3  192.168.1.205       Do1         IfDown

[AccessPoints]# network 192.168.1.201
[192.168.1.201]# show alarms
 Showing network alarms
 A/C   A - Active, C - Clear
 Sev   Alarm Severity
 Count Number of times this state is triggered Id Sev Device IP          Component    Condition 27 P3  192.168.1.201       Do0         FCSErrors relative to RF throughput:

APPARATUS AND METHOD PROVIDING UNIFIED NETWORK MANAGEMENT

CROSS-REFERENCE TO RELATED APPLICATIONS; PRIORITY CLAIM

This application is related to and claims domestic priority under 35 U.S.C. 119(e) from prior provisional application Ser. No. 60/481,788, filed Dec. 14, 2003, the entire contents of which are hereby incorporated by reference for all purposes as if fully set forth herein.

FIELD OF THE INVENTION

The present invention generally relates to computer network management. The invention relates more specifically to methods for managing networks using representations of networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A typical computer network consists of various devices such as routers, switches, wireless access points, firewalls, etc. FIG. 1 illustrates an example network that includes such elements.

A typical network device provides a command interface that is accessible using the telnet protocol, a secure shell (SSH) connection, or serial port interface to create, update, retrieve and store management information relating to the device. A network management station (NMS) can deliver commands through such an interface to provide a higher level or enhanced management capability to the network operator or administrator. Each device in the network can be managed individually by one or more than one network management stations.

The management aspects of a device are defined as mechanisms available on the device to add, delete, modify and monitor the behavior of a device as required by the network operator to achieve the required operation on the device. The management aspects of each device are obtained by means of Simple Network Management Protocol (SNMP), Telnet, Secure Shell (SSH) and other access methods provided by the individual devices.

However, management of large networks is cumbersome, error-prone and time-consuming using current approaches. For example, assume that a large network comprises dozens of network devices of the same type, all of which require the same configuration change. In this context, applying the same change to each device individually is time-consuming and error-prone.

Further, for management purposes, applying a particular configuration command or query to all devices that share a particular characteristic may be useful. Prior systems have offered the ability to display the features or characteristics of a particular device or groups of devices. However, in the past there has been no good way to apply the same command to all devices in a group or view.

Therefore, there is a need for a better way to manage a network to overcome the foregoing problems.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram of command flow from network operator to the device though a unified network management (UNM) framework;

FIG. 5 is an example of navigation using UNM;

FIG. 6 is an example of viewing alarms using UNM;

DETAILED DESCRIPTION

Figure 1:
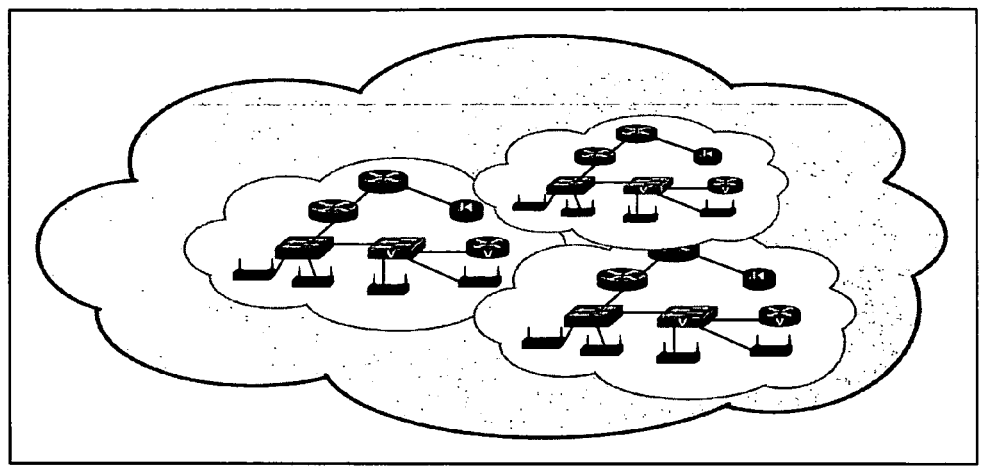
FIG. 1 is a block diagram of a typical network arrangement in which an embodiment may be implemented.

An apparatus and system providing unified network management is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural And Functional Overview |
| 3.0 | Implementation Mechanisms - Hardware Overview |
| 4.0 | Extensions and Alternatives |

1.0 General Overview

The needs identified in the foregoing Background, and other needs and objects that will become apparent from the following description, are achieved in the present invention, which comprises, in one aspect, a method of unified network management comprising the machine-implemented steps of creating and storing a logical tree representation of a network, wherein the network comprises one or more network devices each having one or more characteristics, wherein a root node of the tree represents the entire network, wherein leaf nodes of the tree represent the network devices, wherein one or more intermediate nodes of the tree represent one or more groups of network devices having common characteristics; receiving a first command that selects any of the entire network, the groups, or the devices; receiving one second command that specifies a single management operation for application to each network device in the selected network, groups, or devices; automatically performing the specified management operation on each network device in the selected network, groups, or devices.

In one feature, the management operation comprises displaying a list of devices that are contained in the entire network or the selected group. In another feature, the management operation comprises configuring a plurality of interfaces that are implemented by a plurality of selected devices. In another feature, the management operation comprises configuring a plurality of interfaces that are implemented by all devices in a selected group.

In yet another feature, the management operation comprises displaying one or more alarms that are generated by all devices in a selected group. In still another feature, the management operation comprises displaying one or more events that are generated by all devices in a selected group. According to another feature, the intermediate nodes of the tree represent one or more groups of network devices, wherein the grouped network devices are similar but not identical in device type. In still another feature, a leaf node of the tree representing a device further comprises a sub-tree that represents a file system of the device.

According to another feature, the second command specifies one of a plurality of common management aspects of each device in the selected network, group or devices. In another feature, receiving the first command comprises receiving a plurality of commands that navigate the tree from root to a leaf node or intermediate node.

In other aspects, the invention encompasses a computer apparatus and a computer-readable medium configured to carry out the foregoing steps.

2.0 Structural and Functional Overview

Figure 2:
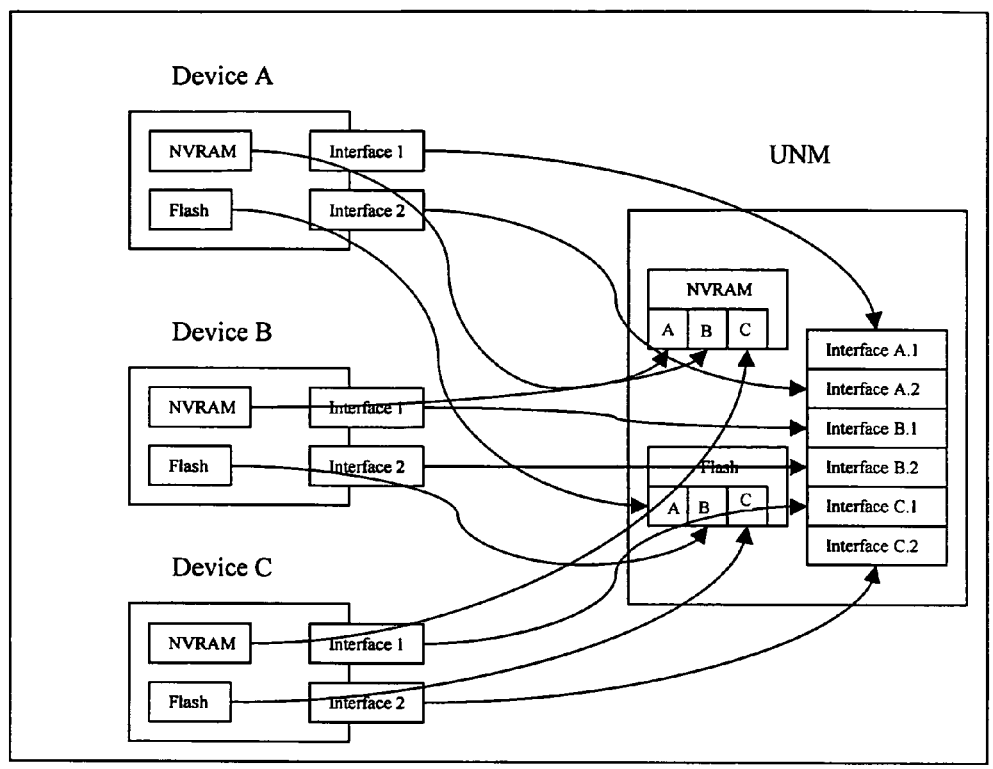
FIG. 2 is a block diagram of unified network management framework according to some embodiments.
Figure 3:
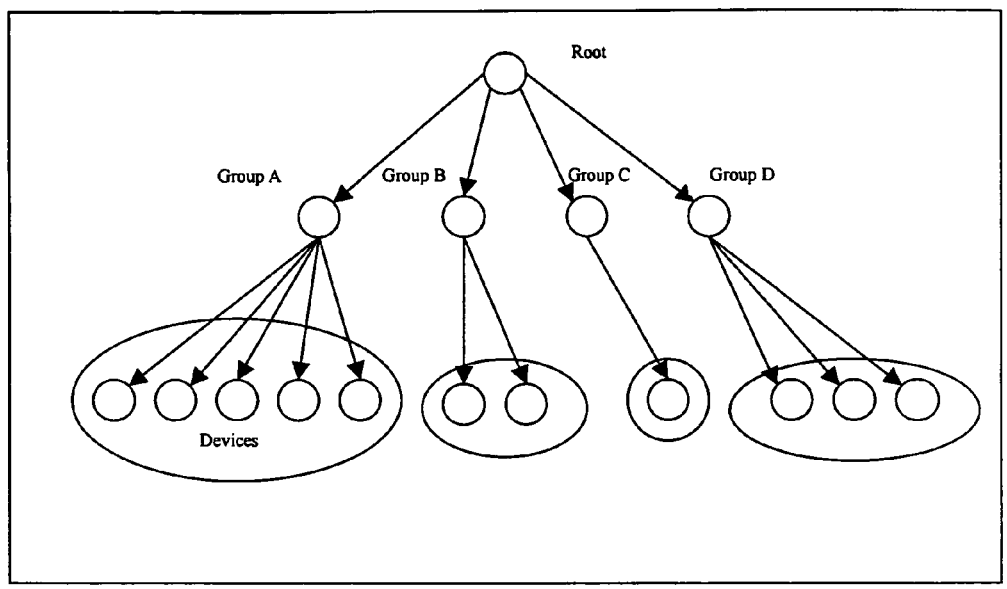
FIG. 3 is a representation of entire network as a tree.

An example embodiment is now described with reference to FIG. 2, FIG. 3, FIG. 4, FIG. 5, and FIG. 6. FIG. 2 is a block diagram of unified network management framework according to some embodiments; FIG. 3 is a representation of entire network as a tree; FIG. 4 is a block diagram of command flow from network operator to the device though unified network management (UNM) framework; FIG. 5 is an example of navigation using UNM; and FIG. 6 is an example of viewing alarms using UNM.

In one embodiment, a Unified Network Management (UNM) framework has the structure depicted in FIG. 2. A managed network may comprise, for example, three devices designated Device A, Device B, and Device C. Each of the devices comprises non-volatile random-access memory (NVRAM), non-volatile flash memory ("Flash"), and two interfaces designated Interface 1, Interface 2. According to an embodiment, information representing the physical elements of each device in the network is mapped to the UNM and represented in the UNM. For example, the UNM comprises an NVRAM data structure that stores information representing the NVRAM of each of Device A, Device B, and Device C. Further, the UNM has a Flash data structure that represents the flash memory of Device A, Device B, and Device C. The UNM further comprises an interface data structure that represents interfaces of each of the devices.

A network device in the managed network may host the UNM. Alternatively, the UNM is hosted in a workstation, server, or other device that is communicatively coupled to the managed network.

In this arrangement, the UNM represents the entire network or subset of the network as if the network or subset comprises a single device. However, all management aspects of each device are made available to the network operator by the UNM framework. For example, a network administrator can get or set values relating to the external interfaces, commands and control characteristics of each device at the UNM framework as if these interfaces and commands are provided by the device that is implementing the UNM framework. In addition to providing the management aspects of the individual devices, UNM also provides network level view of these devices. Two or more devices of similar or different types of devices can be grouped and their common management aspects can be represented as a single device to the operator.

The UNM framework of FIG. 2 represents the entire network as a single device by providing and implementing the management aspects of each individual device that is under its control. The UNM framework represents one device, one or more external interfaces, and one or more commands that are applicable on the interfaces. Management aspects of individual devices in the managed network are exposed to the network operator by means of interfaces and commands. In particular, the interfaces, commands, and characteristics of each device are exposed at the UNM framework, as if these interfaces and commands are provided by the actual framework on the device.

More than one device can implement a UNM framework as shown in FIG. 2 to represent the entire network. A single network can be segmented into multiple networks, and each of the network segments can be managed separately by a different device implementing the UNM framework. Further, the devices implementing the UNM framework can be managed by a single device implementing UNM framework in a clustered fashion.

In one embodiment, the UNM framework implements management aspects of each managed device by any of several means, such as Simple Network Management Protocol (SNMP), TELNET, Secure Shell (SSH) and various other control methods provided by the individual devices.

In one embodiment, the UNM framework is communicatively coupled to a command knowledge base. The command knowledge base describes the command syntax that a particular managed device uses. For example, an embodiment may use a command knowledge base as described in co-pending application Ser. No. 11/012,885, filed Dec. 14, 2004, "METHOD AND SYSTEM FOR AUTOMATICALLY DETERMINING COMMANDS FOR A NETWORK ELEMENT," inventors Krishnam Datla et al., now U.S. Pat. No. 8,190,723, the entire contents of which is hereby incorporated by reference as if fully set forth herein.

The knowledge base may be different for different types of devices, and for different versions of operating system for the same type of device. Therefore, when a user selects multiple devices for applying one management operation, the UNM framework uses a command base containing only commands that are common to all the selected devices. This common command base is built when it is needed, or in real time, before any management operations are invoked. The common command database is used for all the management operations on the selected group of devices.

In an embodiment, the UNM framework provides any or all of the following methods to the network operator to manage the entire network as a single device.

1. According to one feature, an entire managed network is represented as a tree structure in which each device is represented by a node of the tree. Referring now to FIG. 3, a tree representation of a network may comprise a root node representing the entire network. The tree may further comprise one or more group nodes that represent groups of devices. For example, in FIG. 3, intermediate nodes representing group nodes are designated Group A, Group B, Group C, Group D. The tree representation may further comprise leaf nodes that represent network devices, as shown in FIG. 3.

A network device in the managed network also may be represented in the tree representation as an intermediate node, depending on the capabilities or logical connectivity of the device with other devices. Further, if the device has a file system, then the file system can be represented as a sub-tree under the device node.

Additionally, the tree representation may comprise other intermediary nodes that define groups of network elements based on various criteria. One example of such criteria is selecting a group of devices according to the role they play in network. For example, all routers may be represented by one intermediate node. As other examples, all switches, all wireless access points, all wireless access point of certain type X, etc., may be represented by various intermediate nodes.

Using such a representation, the UNM framework enables a network administrator to navigate the entire network in a manner similar to navigating a directory. Further, in one embodiment, the tree representation of a network is implemented using a filesystem, such as the UNIX or LINUX filesystems. A navigation path may proceed from a group of devices to individual devices down to the level of individual files or directories on the device. Referring now to FIG. 4, an example navigation in a filesystem representation of a network is shown. Starting at the top line, and as indicated by the text in subsequent lines of FIG. 4, the prompt "[network]#" indicates that the operator is interacting with the root node representing the entire network. The operator enters a "dir" or "directory" command; in response, the UNM displays a directory of the /network/ node, which includes a "devices/" intermediate node and "groups/" intermediate node.

The operator then navigates to the "devices" group by entering the command "cd devices" meaning "change directory to devices directory." Next in FIG. 4, the operator enters another "dir" command; in response, the UNM displays a list of all devices in the network by name, type, status, and network address.

The operator then moves up to the root node again with the command "cd..". The operator moves down the tree to the "groups" node by entering the "cd groups" command. The operator then obtains a list of all currently defined network groups by entering a "dir" command; in response, the UNM provides a group list that indicates the number of devices in each group and the name of each group (AccessPoints, Switches, MyGroup, offline-devices, etc.). The operator then obtains a list of all devices that are in the AccessPoints group with appropriate "cd" and "dir" commands.

2. According to another feature, the UNM enables an operator to select a group of devices and then access or configure the common management aspects of all the devices in the selected group, as if the operator is interacting with a single device. Referring now to FIG. 5, an example of group selection and interaction is shown. In the first line of FIG. 5, an operator provides an instruction to the UNM with the command "network group AccessPoints." As a result, a group of wireless access point devices named AccessPoints is selected. The operator next enters a "configure" command, which instructs the UNM to enter network configuration mode. The operator then instructs the UNM that the operator wishes to configure all the fast Ethernet interfaces of the devices in the group, with the command "interface all-fast-ethernet". The UNM responds by indicating the number of interfaces in devices in the group that will be affected by subsequent configuration commands. The operator may then enter one or more configuration or other management commands. Thus all selected devices can be configured, modified or monitored as if the user is interacting with a single interface.

3. In another feature, the UNM enables a user to select a device or a group of devices and to then display or receive alarms from the selected group. FIG. 6 shows an example of such interaction with the UNM. Referring to the first line of FIG. 6, a network operator selects a group of wireless access points of a certain type using the command "cd AccessPoints." The operator then displays all devices in that group with the "dir" command.

The operator enters the command "show alarms" to view alarms for the selected devices. In response, the UNM displays a list network alarms, but only the alarms that have been received from the devices in the selected group. Thus, the network operator receives a display of alarms from a plurality of devices, but the network operator is only required to issue one "show alarm" command. Therefore, interaction with the network is greatly simplified. For example, in prior approaches, the operator would have had to connect to each device individually and then enter the "show alarms" command for each device.

The same general approach as described above may be used when the network operator wishes to display alarm information for a single device. Referring again to FIG. 6, the operator next enters the command "network 192.168.1.201," which indicates that the operator wishes to interact only with the device having the specified IP address. The operator then enters a "show alarms" command. In response, the UNM displays alarm information only for the specified device.

4. In yet another feature, the UNM enables an operator to select a device or group of devices to receive events from the selected group. One example is a group wireless access points of certain type X is selected and only the events received from these devices are presented to the network operator as if the events are coming from a single device.

5. In still another feature, the UNM enables an operator to apply a single configuration policy or configuration command to a device or a group of devices. Examples include:
 a. allow firmware-version 10.3.1 for group=AccessPoints
 b. allow firmware-version 9.9.9 for device=192.168.1.1
 c. allow firmware-version 1.1.1 for devicetype=switch 6. In still another feature, the UNM enables a network operator to apply the same commands available on a device to perform a task at the network level so that the command is applied to the all devices selected.

In one embodiment, the UNM implements multiple levels of commands that can be applied to network devices or groups in various ways. At a first level, the UNM provides the same commands that are available on the devices that the UNM manages. At a second level, the UNM provides commands that are common to the selected devices. At a third level, the UNM provides additional commands that are not supported on the devices. In alternate embodiments, the UNM provides other levels with increasing levels of device abstraction than the levels specified above. In these embodiments, the UNM provides flexibility to the network operator through the multiple levels. This enables the network operator to use the same native commands available on the devices operate on the whole network.

The UNM of FIG. 2, tree representation of FIG. 3, and the processes that are illustrated by FIG. 4, FIG. 5, and FIG. 6 may be implemented using one or more computer programs, processes, or other software elements. In other embodiments, an apparatus is provided comprising a device that manages the network and devices in it and allows a network operator to manage the network and devices as a single device. In one feature, the native interface of the devices in the network is made available. In another feature, the same kind of devices in a network are grouped and appear as a single device to the network operator. In yet another feature, common commands across similar devices in a network can be applied by a network operator to all devices using a single command.

In another feature, the entire network is represented as tree where devices, group of devices are represented by nodes according to certain criteria. In a related feature, the file system of the device is represented as sub-tree under the device node. In yet another feature, common management aspects of devices are made available to the network operator, based on a current node that is selected during network tree navigation.

3.0 Implementation Mechanisms—Hardware Overview

Figure 7:
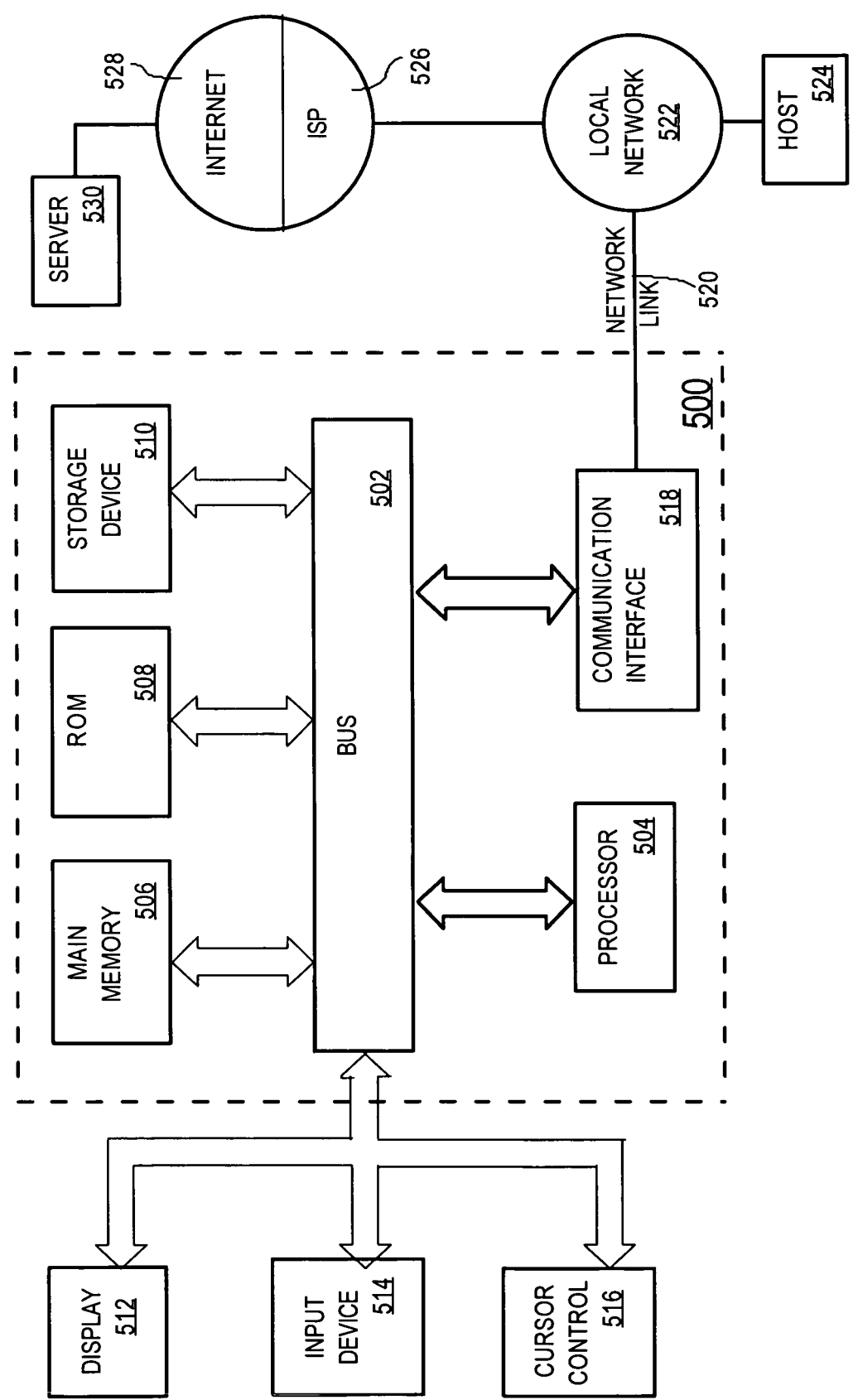
FIG. 7 is a block diagram that illustrates a computer system upon which an embodiment may be implemented.

FIG. 7 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for unified network management. According to one embodiment of the invention, unified network management is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for generating diagnoses of network problems as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising the machine-implemented steps of:
    creating and storing a logical tree representation of a network, wherein the network comprises one or more network devices each having one or more characteristics, wherein a root node of the tree represents the entire network, wherein leaf nodes of the tree represent the network devices, wherein one or more intermediate nodes of the tree represent one or more groups of network devices having common characteristics;
    receiving a first command that selects any of the entire network or the devices;
    wherein each device of a set of network devices selected by the first command is associated with one or more commands at a plurality of levels, wherein a first level command is included in a native device interface for said each device, and a second level command is not natively supported on said each device;
    in response to receiving the first command, building a command base comprised of first level commands and second level commands, wherein building said command base further comprises:
        determining a set of first level commands, wherein each first level command of the set of first level commands is associated with all devices of said set of network devices;
        determining a set of second level commands, wherein each second level command of the set of second level commands is associated with all devices of said set of network devices;
    receiving one second command that specifies a single management operation for application to each network device in said set of network devices;
    determining a third command for performing the single management operation based on the second command and the command base;
    wherein the third command is selected from the set of first level commands in the command base;
    automatically executing said third command to perform the specified management operation only on each network device in said set of network devices;
    wherein the method is performed by one or more computing devices.

2. The method of claim 1,
    wherein the first command selects groups of the one or more groups, wherein each group of the selected groups represents a plurality of selected devices; and
    wherein the second command specifies the single management operation of a plurality of management operations, said plurality of management operations including at least one of:
    a) configuring one or more interfaces of the plurality of selected devices; or
    b) displaying alarms raised only by the plurality of selected devices, wherein devices not in the plurality of selected devices raise alarms that are not displayed.

3. A method as recited in claim 2, wherein the management operation comprises displaying a list of devices that are contained in the entire network or the selected group.

4. A method as recited in claim 2, wherein the management operation comprises configuring a plurality of interfaces that are implemented by all devices in a selected group.

5. A method as recited in claim 2, wherein the management operation comprises displaying one or more alarms that are generated only by devices in a selected group, wherein a network device that is not in a selected group generates an alarm, and the alarm generated by the network device that is not in a selected group is not displayed.

6. A method as recited in claim 2, wherein the management operation comprises displaying one or more events that are generated only by devices in a selected group, wherein a network device that is not in a selected group of devices generates an event, and the event generated by the device that is not in a selected group is not displayed.

7. A method as recited in claim 2, wherein the second command specifies one of a plurality of common management aspects of each device in the selected network, group or devices.

8. A method as recited in claim 1, wherein the management operation comprises configuring a plurality of interfaces that are implemented by a plurality of selected devices.

9. A method as recited in claim 1, wherein the intermediate nodes of the tree represent one or more groups of network devices, wherein the grouped network devices are similar but not identical in device type.

10. A method as recited in claim 1, wherein a file system on a device is represented as a sub-tree in the logical tree representation of the network, wherein the device is represented by an intermediate node in the logical tree representation of the network;
    wherein the intermediate node representing the device is a root of the subtree representing the file system.

11. A method as recited in claim 1, wherein receiving the first command comprises receiving a plurality of commands that navigate the tree from root to a leaf node or intermediate node.

12. A non-transitory computer-readable volatile or non-volatile medium comprising one or more sequences of instructions which, when executed by one or more processors, cause the one or more processors to perform the steps of:
    creating and storing a logical tree representation of a network, wherein the network comprises one or more network devices each having one or more characteristics, wherein a root node of the tree represents the entire network, wherein leaf nodes of the tree represent the network devices, wherein one or more intermediate nodes of the tree represent one or more groups of network devices having common characteristics;
    receiving a first command that selects any of the entire network or the devices;
    wherein the entire network or the devices selected by the first command represent a set of network devices that includes a first network device and a second network device, wherein a type of network device for the first network device is different from a type of network device for the second network device;
    in response to receiving the first command, building a command base that contains only commands that are common to all network devices in said set of network devices;
    receiving one second command that specifies a single management operation for application to each network device in said set of network devices;
    determining a third command for performing the single management operation based on the second command and the command base;

wherein the third command is selected from the set of first level commands in the command base;

automatically executing said third command to perform the specified management operation only on each network device in said set of network devices.

13. A non-transitory computer-readable volatile or non-volatile medium as recited in claim 12, wherein the first command selects groups of the one or more groups, wherein each group of the selected groups identifies a plurality of selected devices; and wherein the second command specifies the single management operation of a plurality of management operations, said plurality of management operations including at least one of:

a) configuring one or more interfaces of the plurality of selected devices; or b) displaying alarms raised only by the plurality of selected devices, wherein devices not in the plurality of selected devices raise alarms that are not displayed.

14. A non-transitory computer-readable volatile or non-volatile medium as recited in claim 13, wherein the management operation comprises displaying a list of devices that are contained in the entire network or the selected group.

15. A non-transitory computer-readable volatile or non-volatile medium as recited in claim 13, wherein the management operation comprises configuring a plurality of interfaces that are implemented by all devices in a selected group.

16. A non-transitory computer-readable volatile or non-volatile medium as recited in claim 13, wherein the management operation comprises displaying one or more alarms that are generated only by devices in a selected group, wherein a network device that is not in a selected group generates an alarm, and the alarm generated by the network device that is not in a selected group is not displayed.

17. A non-transitory computer-readable volatile or non-volatile medium as recited in claim 13, wherein the management operation comprises displaying one or more events that are generated only by devices in a selected group, wherein a network device that is not in a selected group of devices generates an event, and the event generated by the device that is not in a selected group is not displayed.

18. A non-transitory computer-readable volatile or non-volatile medium as recited in claim 13, wherein the second command specifies one of a plurality of common management aspects of each device in the selected network, group or devices.

19. A non-transitory computer-readable volatile or non-volatile medium as recited in claim 12, wherein the management operation comprises configuring a plurality of interfaces that are implemented by a plurality of selected devices.

20. A non-transitory computer-readable volatile or non-volatile medium as recited in claim 12, wherein the intermediate nodes of the tree represent one or more groups of network devices, wherein the grouped network devices are similar but not identical in device type.

21. A non-transitory computer-readable volatile or non-volatile medium as recited in claim 12, wherein a file system on a device is represented as a sub-tree in the logical tree representation of the network, wherein the device is represented by an intermediate node in the logical tree representation of the network; wherein the intermediate node representing the device is a root of the subtree representing the file system.

22. A non-transitory computer-readable volatile or non-volatile medium as recited in claim 12, wherein the instructions for receiving the first command comprise instructions for receiving a plurality of commands that navigate the tree from root to a leaf node or intermediate node.

* * * * *